(12) United States Patent
Dennis et al.

(10) Patent No.: US 10,941,295 B2
(45) Date of Patent: Mar. 9, 2021

(54) MOLECULAR GLASSES AS RHEOLOGICAL MODIFIERS IN HIGH-PERFORMANCE POLYMERS

(71) Applicant: INTERNATIONAL BUSINESS MACHINES CORPORATION, Armonk, NY (US)

(72) Inventors: Joseph M Dennis, San Jose, CA (US); Robert D Allen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/159,656

(22) Filed: Oct. 13, 2018

(65) Prior Publication Data

US 2020/0115553 A1   Apr. 16, 2020

(51) Int. Cl.
  *C08L 81/06* (2006.01)
  *C08K 5/41* (2006.01)
  *C08L 71/00* (2006.01)
  *C08L 79/08* (2006.01)

(52) U.S. Cl.
  CPC ............... *C08L 81/06* (2013.01); *C08K 5/41* (2013.01); *C08L 71/00* (2013.01); *C08L 79/08* (2013.01); *C08K 2201/002* (2013.01)

(58) Field of Classification Search
  CPC .......... C08L 81/06; C08L 71/00; C08L 79/08; C08K 5/41; C08K 2201/002
  USPC ...................................................... 524/171
  See application file for complete search history.

(56) References Cited

U.S. PATENT DOCUMENTS

| | | |
|---|---|---|
| 3,201,364 A | 8/1965 | Salyer |
| 5,102,952 A | 4/1992 | Memon |
| 5,302,429 A | 4/1994 | Memon |
| 6,492,462 B2 | 12/2002 | Bitler et al. |
| 6,673,872 B2 | 1/2004 | van Beek et al. |
| 7,338,994 B2 | 3/2008 | Walton et al. |
| 7,507,474 B2 | 3/2009 | Varlet et al. |
| 2004/0034170 A1 | 2/2004 | Brant |
| 2010/0152346 A1 | 6/2010 | Yang et al. |

(Continued)

OTHER PUBLICATIONS

Huang et al. "Effect of Low-Concentration Polymers on Crystal Growth in Molecular Glasses: A Controlling Role for Polymer Segmental Mobility Relative to Host Dynamics", Journal of Physical Chemistry B (2017), 121(8), 1963-1971 (Year: 2017).*

(Continued)

*Primary Examiner* — Michael Bernshteyn
(74) *Attorney, Agent, or Firm* — Karen Canaan; CanaanLaw, P.C.

(57) ABSTRACT

Resin compositions made of high-performance polymers blended with molecular glass as rheological modifiers are disclosed. The high-performance polymers include thermoplastics, such as polysulfones, polyimides, poly(ether imides), polyketones, poly(ether ketones), and combinations thereof. The molecular glasses are amorphous, non-oligomeric, and have one or more functional groups that promote miscibility of the molecular glass with the high-performance polymers to produce a resin composition with low melt viscosity. Incorporation of the molecular glasses into the high-performance polymers does not alter the Young's modulus and yield stress values of the high-performance polymers.

39 Claims, 5 Drawing Sheets

(56) References Cited

U.S. PATENT DOCUMENTS

2016/0052927 A1  2/2016 Pfaendner et al.

OTHER PUBLICATIONS

Powel et al. "Fracture of molecular glasses under tension and increasing their fracture resistance with polymer additives", Journal of Non-Crystalline Solids (2015), 429, 122-128. (Year: 2015).*
Walker et al. "Optimization of the photochromic response of photoaddressable polymers with azobenzene-containing molecular glasses", Proceedings of SPIE (2009), 7358(Holography), 735803/1-735803/9. (Year: 2009).*

* cited by examiner

MOLECULAR GLASSES AS RHEOLOGICAL MODIFIERS IN HIGH-PERFORMANCE POLYMERS

TECHNICAL FIELD

The present invention relates generally to high-performance polymer resins and more specifically to high-performance polymers modified with molecular glasses.

BACKGROUND OF THE INVENTION

High-performance polymers are tough materials with high glass transition temperatures (Tg>150° C.) and are widely used in applications ranging from automotive and aerospace lightweight paneling to separation membranes. The use of high-performance polymers, however, comes with many challenges. For example, the common processing technique of melt extrusion for high-molecular-weight polymers requires temperatures in excess of 300° C. Furthermore, the highly aromatic structure of the typical high-performance polymer results in high melt viscosities causing issues when smaller part features are required.

Typical rheological modifiers added to polymer resins fall into two main categories: (1) polymeric additives (MW>5,000 g/mol) and (2) small molecule additives (MW<300 g/mol). Modifying high-performance polymers with polymeric additives can cause miscibility issues arising from the combination of the two relatively high molecular weight species. The macroscopic phase separation that occurs when the additive/polymer pair is not carefully calibrated can lead to deterioration in mechanical properties of the combination. Modifying high-performance polymers with small molecule additives circumvents the issues with miscibility; however, the high volatility and low boiling points of the small molecules prevents their use at the elevated processing temperatures required for high-performance polymers. In view of these challenges, there remains a need in the art for suitable additives and processes that can improve the applicability of high-performance polymers.

SUMMARY OF THE INVENTION

The present invention overcomes the need in the art by providing molecular glasses that are thermally stable, low-volatile, and miscible with high-performance polymers.

In one embodiment, the present invention relates to a composition comprising: a polymer with Tg>150° C. and Mw>10,000 g/mol; and a molecular glass, wherein in its neat state, the molecular glass is amorphous and non-oligomeric with a polydispersity index between 1.0 and 1.7, Mw in the range of 500 g/mol to 2,000 g/mol, and at least one functional group that promotes miscibility with the polymer, wherein the molecular glass is dispersed in the polymer to form a resin and further wherein the molecular glass has a concentration in the resin of 0.01% to 50% w/w.

In a further embodiment, the at least one functional group of the molecular glass is selected from the group consisting of sulfones, ethers, esters, amides, isopropylidenes, and combinations thereof. In another embodiment, the at least one functional group of the molecular glass is a sulfone.

In a further embodiment, the molecular glass has an aromatic core. In another embodiment, the aromatic core comprises at least one phenyl ring.

In a further embodiment, the molecular glass has a structure with sulfone functional groups accordingly to (A):

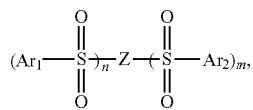

wherein each of n and m is an integer between 1 and 3 and 2≤(n+m)≤4; Z is a linking group; and Ar1 and Ar2 are identical or different aromatic groups. In another embodiment, Z is selected from the group consisting of linear aliphatic groups, branched aliphatic groups, cycloaliphatic groups, aromatic groups, esters, ethers, amides, and combinations thereof. In a further embodiment, Ar1 and Ar2 independently comprise a phenyl ring. In another embodiment, Ar1 and Ar2 independently comprise an aromatic group bearing an additional functional group. In a further embodiment, the additional functional group is selected from the group consisting of aliphatic groups, aromatic groups, esters, ethers, amides, and combinations thereof. In another embodiment, Ar1 and Ar2 independently comprise at least one phenyl ring, wherein the phenyl ring is substituted at any position with linear and/or branched aliphatic groups.

In a further embodiment, the molecular glass has diphenylsulfone functional groups and the molecular glass has a structure according to (B) or (C):

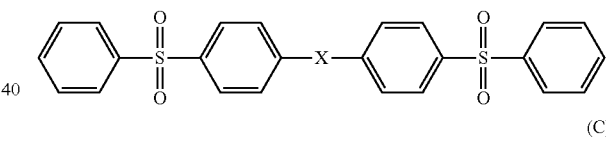

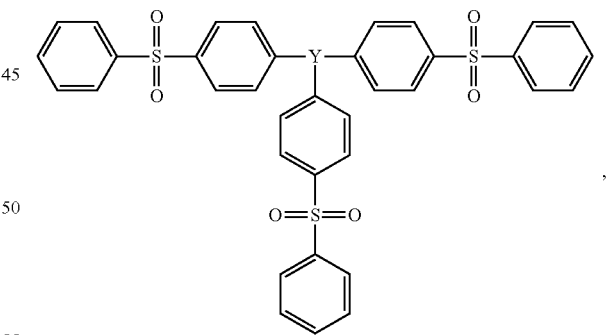

wherein X and Y independently comprise (i) at least one aromatic ring and (ii) ether linkages to the diphenylsulfone functional groups.

In another embodiment, the molecular glass is selected from the group consisting of 9,9-bis(4-(4-(phenylsulfonyl)phenoxy)phenyl)-9H-fluorene (FLPS); 4,4',4''-(ethane-1,1,1-triyl)tris((4-(phenylsulfonyl)phenoxy)benzene) (TDPSPE); and 4,4',4''-bis(9-(6-(4-(phenylsulfonyl)phenoxy)naphthalen-2-yl)-9H-fluoren-9-yl)-1,1'-biphenyl (FLBPS):

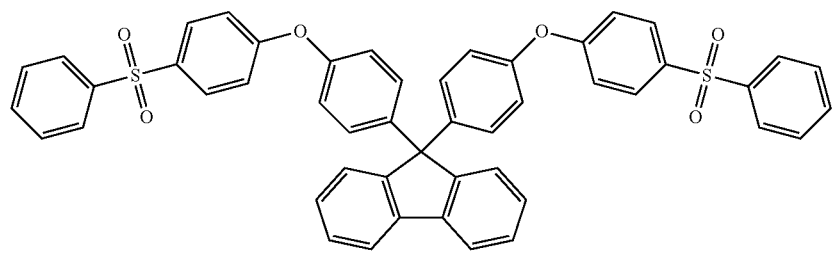

FLPS

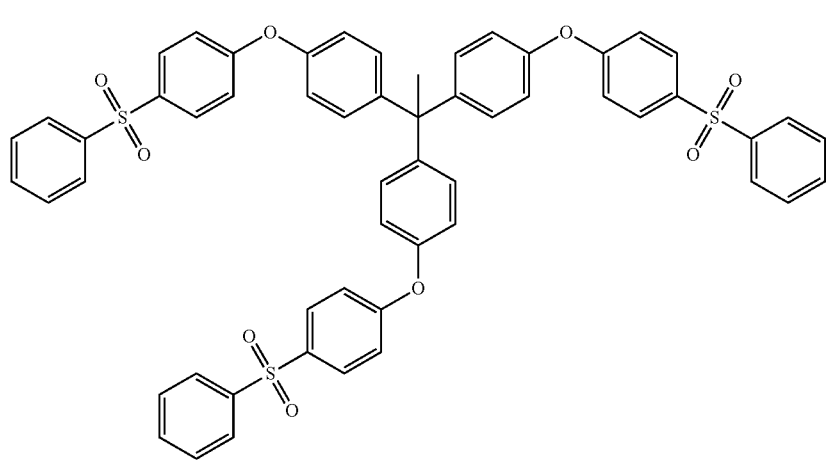

TDPSPE

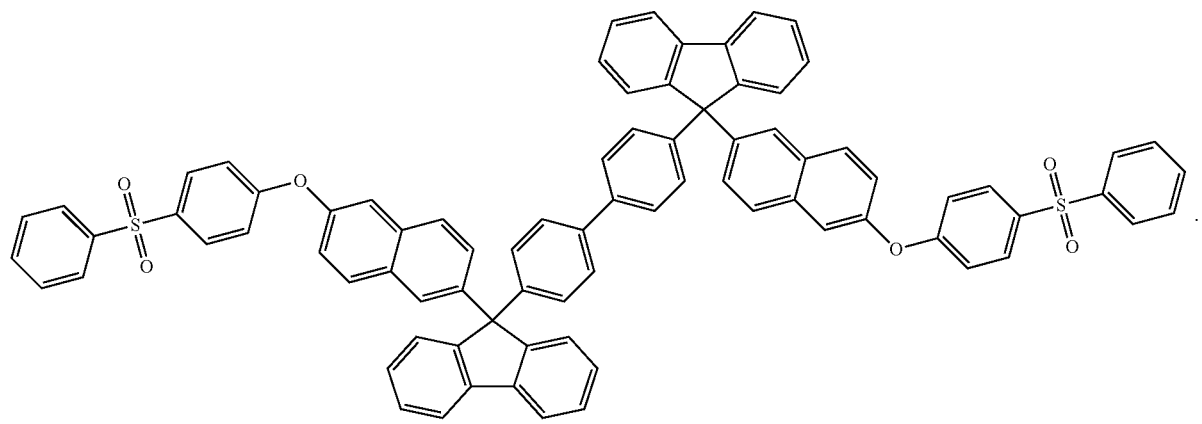

FLBPS

In a further embodiment, the resin has a zero-shear melt viscosity ratio that is less than 1.0. In another embodiment, the melt viscosity of the resin is less than the melt viscosity of the polymer in its neat state.

In a further embodiment, the Young's modulus and yield stress values of the resin are within 10% of the Young's modulus and yield stress values of the polymer in its neat state.

In another embodiment, the polymer is a thermoplastic. In a further embodiment, the polymer is selected from the group consisting polysulfones, polyimides, poly(ether imides), polyketones, and poly(ether ketones).

In another embodiment, the molecular glass in its neat state has a Tg>50° C. In a further embodiment, the molecular glass in its neat state has a Tg in the range of 70° C. to 200° C.

Additional aspects and embodiments of the invention will be provided, without limitation, in the detailed description of the invention that is set forth below.

DETAILED DESCRIPTION OF THE INVENTION

Figure 1:
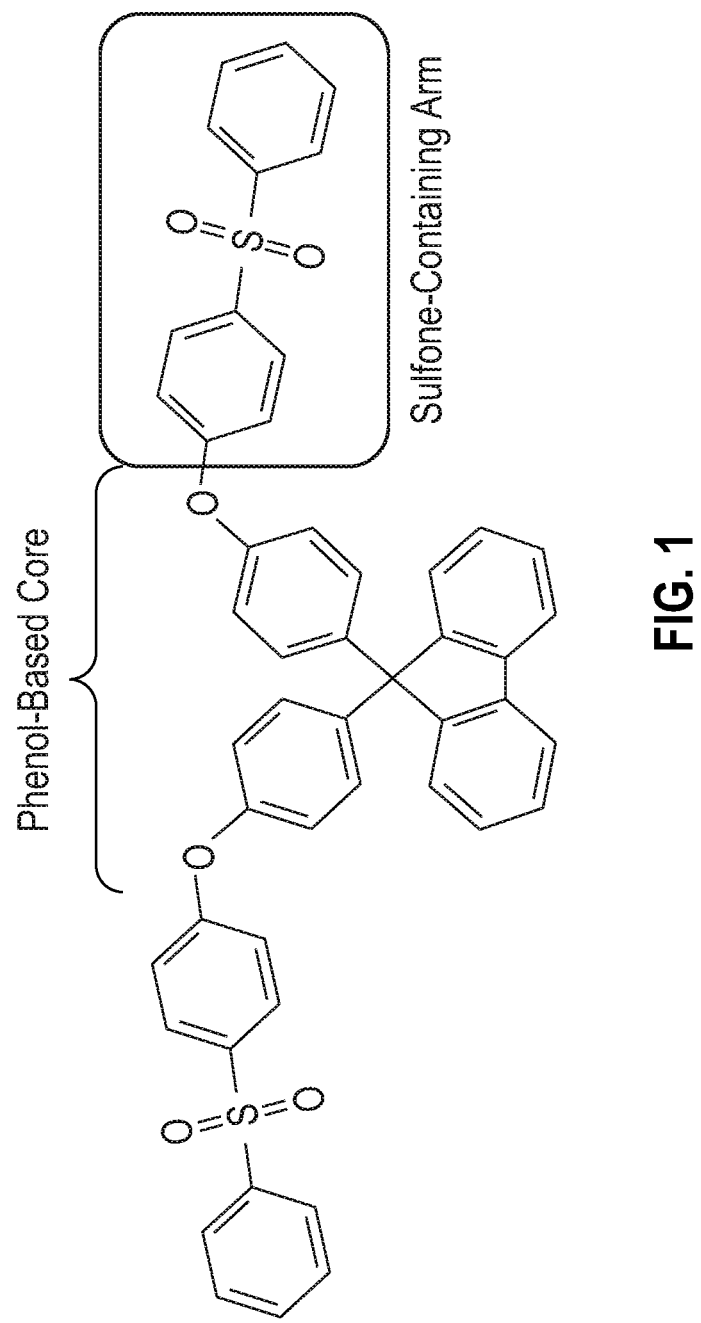
FIG. 1 is a schematic showing a representative structure of the molecular glass described herein.

Set forth below is a description of what are currently believed to be preferred embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. Likewise, plural referents include singular forms unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

As used herein, the term "high-performance polymer," refers to a polymer with a glass transition temperature greater than 150° C. (Tg>150° C.) and a molecular weight (Mw) greater than 10,000 g/mol.

As used herein, the term "amorphous" is meant to refer to a molecular structure that has no clearly defined shape or form.

The term "oligomeric" is understood in the art to refer to a molecular structure that has at least one defined repeat unit. As used herein, the term "non-oligomeric" is meant to refer to a molecular structure that has no definitive repeat unit.

As used herein, the term "zero-shear melt viscosity ratio" is meant to refer to the ratio of zero-shear melt viscosity of a high-performance polymer/molecular glass blend to the zero-shear melt viscosity of an unmodified high-performance polymer resin.

As used herein, the term "aromatic group" is meant to refer to: carbocyclic aromatic groups, such as phenyl, naphthyl, and anthracyl; heteroaryl groups, such as imidazolyl, thienyl, furanyl, pyridyl, pyrimidyl, pyranyl, pyrazolyl, pyrroyl, pyrazinyl, thiazole, oxazolyl, and tetrazole; and fused polycyclic aromatic ring systems in which a carbocyclic aromatic ring or heteroaryl ring is fused to one or more other heteroaryl rings, such as benzothienyl, benzofuranyl, indolyl, quinolinyl, benzothiazole, benzooxazole, benzimidazole, quinolinyl, isoquinolinyl and isoindolyl.

In one embodiment, the present invention relates to a resin composition comprising a high-performance polymer blended with a molecular glass as a rheological modifier. Examples of high-performance polymers that may be used in the resin composition include, without limitation, thermoplastics, such as, polysulfones, polyimides, poly(ether imides), polyketones, poly(ether ketones), and combinations thereof. It is to be understood that other thermoplastics may also have utility in the resin compositions described herein. Many different molecular glasses may be blended with the high-performance polymers to produce the resin compositions. Such molecular glasses will generally be amorphous, non-oligomeric, and have one or more functional groups that promote miscibility and/or solubility of the molecular glass with the high-performance polymers while being non-reactive at elevated temperatures. Examples of solubility-enhancing functional groups on the molecular glass include without limitation, a sulfone, an ether, an ester, an amide, an isopropylidene, and combinations thereof.

In another embodiment, the resin composition comprises an amorphous, non-oligomeric molecular glass with a solubility-enhancing functional group and an aromatic core. In such a configuration, the solubility-enhancing functional group assists in preventing crystallization of the molecular glass, while the aromatic core aids in solubility in the highly-aromatic polymer resin. FIG. 1 shows a representative molecular glass comprising an aromatic core and sulfone-containing arms linked through an ether bond.

In a further embodiment, the resin composition comprises a molecular glass with sulfone functional groups according to structure (A):

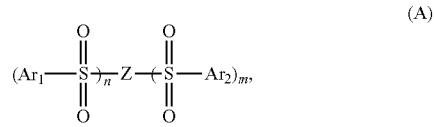

wherein each of n and m is an integer between 1 and 3 and $2 \leq (n+m) \leq 4$; Z represents a linking group; and Ar1 and Ar2 represent identical or different aromatic groups. The Z linking group may be selected from the group consisting of linear and branched aliphatic groups, cycloaliphatic groups, aromatic groups, esters, ethers, amides, and combinations thereof. In one embodiment, Ar1 and Ar2 may independently comprise a phenyl ring. In another embodiment, Ar1 and Ar2 may independently comprise an aromatic group bearing an additional functional group. In a further embodiment, the additional functional group may be selected from aliphatic groups, cycloaliphatic groups, aromatic groups, esters, ethers, amides, and combinations thereof. In another embodiment, Ar1 and Ar2 independently comprise at least one phenyl ring, wherein the phenyl ring is substituted at any position with linear and/or branched aliphatic groups. In a further embodiment, the sulfone functional groups are diphenylsulfone functional groups and the resin composition comprises a molecular glass selected from structures (B) or (C):

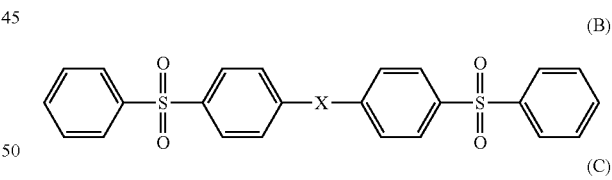

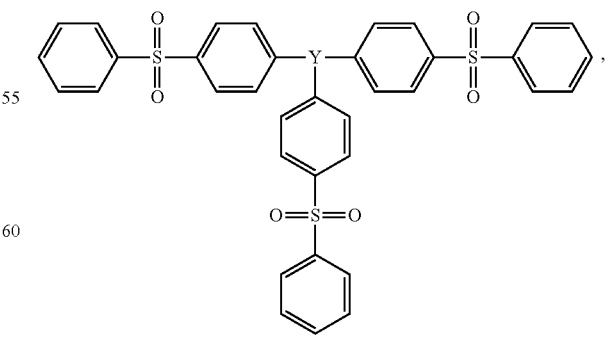

wherein X and Y each independently comprise (i) at least one aromatic ring and (ii) ether linkages to the diphenylsulfone functional groups. Three exemplary, but non-limiting, molecular glasses that have utility in the resin composition described herein are 9,9-bis(4-(4-(phenylsulfonyl)phenoxy)phenyl)-9H-fluorene (FLPS); 4,4',4"-(ethane-1,1,1-triyl)tris((4-(phenylsulfonyl)phenoxy)benzene) (TDPSPE); and 4,4',4"-bis(9-(6-(4-(phenylsulfonyl)phenoxy)naphthalen-2-yl)-9H-fluoren-9-yl)-1,1'-biphenyl (FLBPS). Examples 1-3 describe the synthesis of FLPS, TDPSPE, and FLBPS, respectively. As disclosed in those Examples, the Tgs of the three molecular glasses range from about 70° C. to about 200° C. FLPS, TDPSPE, and FLBPSE have the following structures:

range of 70° C. to 200° C. In one embodiment, the concentration of the molecular glass in the resin composition is in the range of 0.01% to 50% by weight (w/w). In another embodiment, the concentration of the molecular glass in the resin composition is in the range of 0.01% to 30% by weight (w/w).

Tables 1 and 2 show that the molecular glasses described herein reduce the melt viscosity of high-performance polymers at typical processing temperatures (the melt viscosity procedure is described in Example 5). The data in Tables 1 and 2 shows the impact on zero-shear melt viscosity at 300° C. when a molecular glass is incorporated into a polysulfone

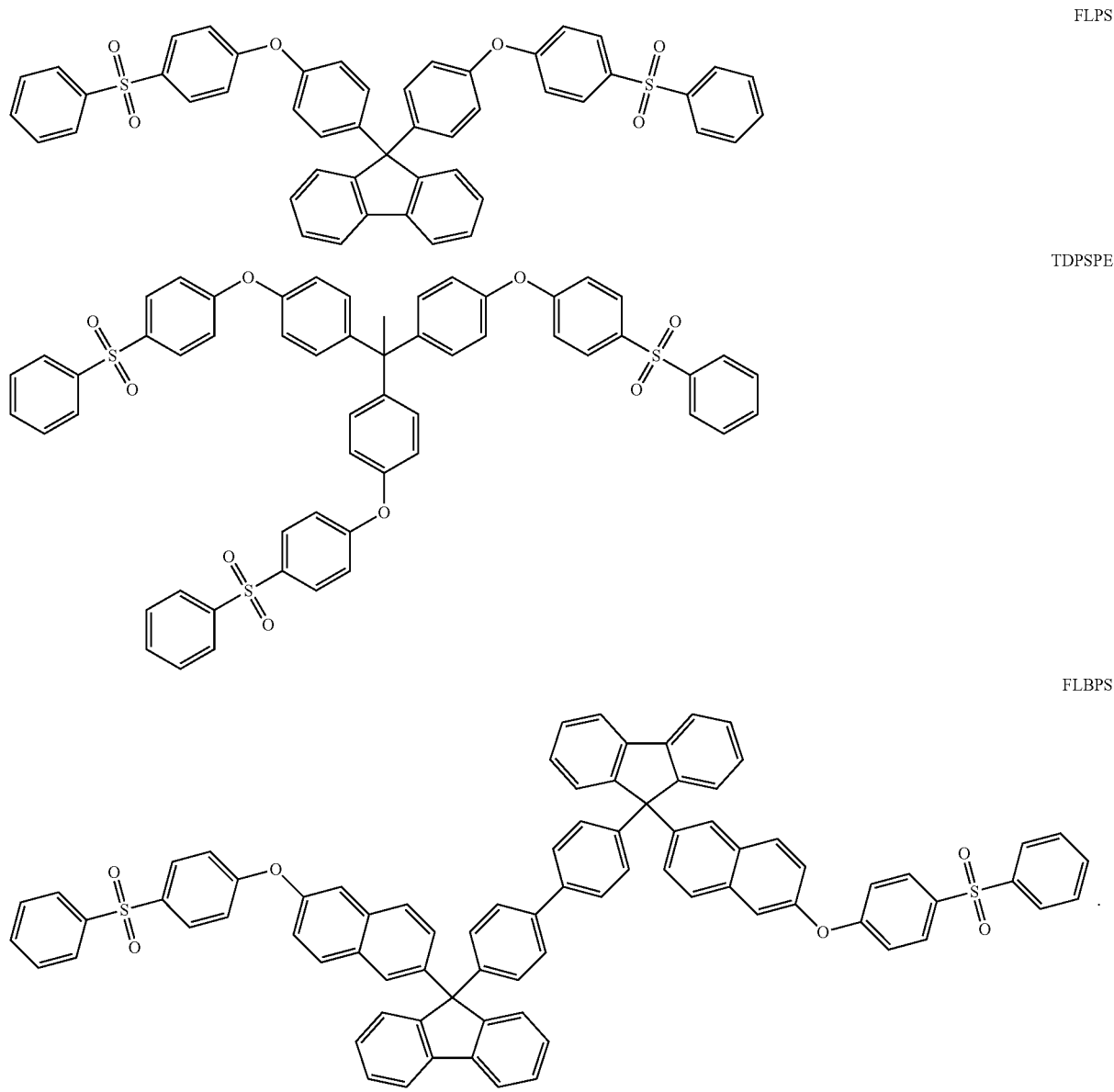

FLPS

TDPSPE

FLBPS

Molecular glasses that have utility in forming the resin compositions described herein may further have a polydispersity index between 1.0 and 1.7 and Mw in the range of 500 g/mol to 2,000 g/mol. In one embodiment, the molecular glass in neat state has a Tg greater than 50° C. In another embodiment, the molecular glass in neat state has a Tg in the resin or a poly(ether imide) resin, respectively. For each of the three molecular glasses (FLPS, TDPSPE, and FLBPS), a critical concentration of the molecular glass is required to reduce the zero-shear melt viscosity of the blend below that of the unblended polymer resin. The structure of the different molecular glasses has a varying influence on the melt viscosity at a given concentration. For example, at a 5 wt. % loading of molecular glass into polysulfone, FLPS increases the zero-shear melt viscosity of the resin (from 1 to 1.5), while TDPSPE reduces the viscosity by ~20% (from 1 to 0.83) (Table 1). This variability in structure-property relationship between different polymer resins and molecular glasses highlights the versatility of this method to tune high-performance materials to better suit the processing needs. In one embodiment, the melt viscosity of the blended high-performance polymer/molecular glass composition is less than the melt viscosity of the high-performance polymer in its neat state. In another embodiment, the temperature range at which the melt viscosity of the blended composition is measured is greater than the Tg of the high-performance polymer, but less than 400° C. (onset of degradation). In a further embodiment, the temperature range at which the melt viscosity of the blended composition is measured is about 180° C. to about 400° C.

Table 1 shows the ratio of zero-shear melt viscosity at 300° C. when FLPS, TDPSPE, and FLBPS are incorporated into a polysulfone resin.

TABLE 1

| Molecular Glass | Wt. (%) | | | | |
|---|---|---|---|---|---|
| $\eta_{0,\ blend}/\eta_{0,\ polysulfone}$ | 0 | 1 | 5 | 10 | 20 |
| FLPS | 1 | 0.88 | 1.5 | 0.42 | 0.19 |
| TDPSPE | 1 | 1.6 | 0.83 | 0.62 | 0.17 |
| FLBPS | 1 | 4.2 | 3.0 | 2.3 | 0.86 |

Table 2 shows the ratio of zero-shear melt viscosity at 320° C. when FLPS and TDPSPE are incorporated into a poly(ether imide) resin.

TABLE 2

| Molecular Glass | Wt. (%) | | | | |
|---|---|---|---|---|---|
| $\eta_{0,\ blend}/\eta_{0,\ poly(ether\ imide)}$ | 0 | 1 | 5 | 10 | 20 |
| FLPS | 1 | 0.45 | 0.24 | 0.17 | 0.03 |
| TDPSPE | 1 | 0.31 | 0.23 | 0.16 | 0.075 |

Tables 3-6 show that incorporation of the molecular glasses described herein into resins comprised of high-performance polymers does not alter the mechanical properties, such as Young's modulus and yield stress, of the high-performance polymers. Tables 1-6 use FLPS, TDPSPE, and FLBPS as exemplary molecular glasses, which are blended into polysulfone or poly(ether imide) as exemplary polymer resins.

Table 3 shows the mechanical properties of polysulfone blended with FLPS.

TABLE 3

| Polysulfone/FLPS | Wt. (%) | | | | |
|---|---|---|---|---|---|
| | 0 | 1 | 5 | 10 | 20 |
| Strain at Break (%) | 28 | 31 | 22 | 7 | 4 |
| Young's Modulus (GPa) | 2.1 | 2.1 | 2.0 | 2.1 | 2.7 |
| Stress at Yield (MPa) | 77 | 71 | 81 | 82 | 80 |

Table 4 shows the mechanical properties of polysulfone blended with TDPSPE.

TABLE 4

| Polysulfone/TDPSPE | Wt. (%) | | | | |
|---|---|---|---|---|---|
| | 0 | 1 | 5 | 10 | 20 |
| Strain at Break (%) | 28 | 10 | 6 | 5 | 6 |
| Young's Modulus (GPa) | 2.1 | 1.8 | 2.1 | 2.1 | 2.3 |
| Stress at Yield (MPa) | 77 | 73 | 71 | 74 | 75 |

Table 5 shows the mechanical properties of polysulfone blended with FLBPS.

TABLE 5

| Polysulfone/FBLPS | Wt. (%) | | | | |
|---|---|---|---|---|---|
| | 0 | 1 | 5 | 10 | 20 |
| Strain at Break (%) | 28 | 15 | 39 | 26 | 8 |
| Young's Modulus (GPa) | 2.1 | 1.7 | 1.6 | 2.0 | 2.0 |
| Stress at Yield (MPa) | 77 | 70 | 77 | 70 | 82 |

Table 6 shows the mechanical properties of poly(ether imide) blended with TDPSPE.

TABLE 6

| Poly(ether imide)/TDPSPE | Wt. (%) | | | | |
|---|---|---|---|---|---|
| | 0 | 1 | 5 | 10 | 20 |
| Strain at Break (%) | 11 | 10 | 8 | 7 | 7 |
| Young's Modulus (GPa) | 2.1 | 2.4 | 2.4 | 2.3 | 2.3 |
| Stress at Yield (MPa) | 95 | 109 | 106 | 96 | 104 |

Figure 2:
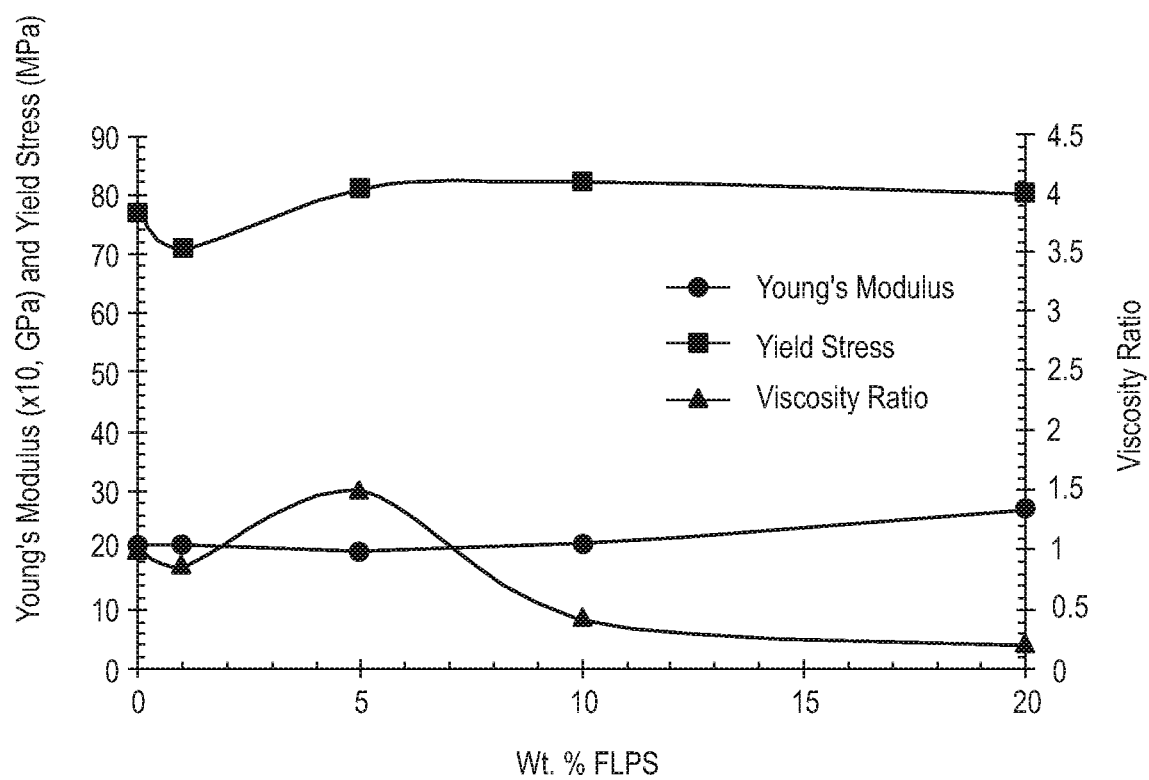
FIG. 2 is a graph that overlays viscosity trends with the mechanical properties of Young's modulus and yield stress for a polysulfone resin blended with the molecular glass FLPS.
Figure 3:
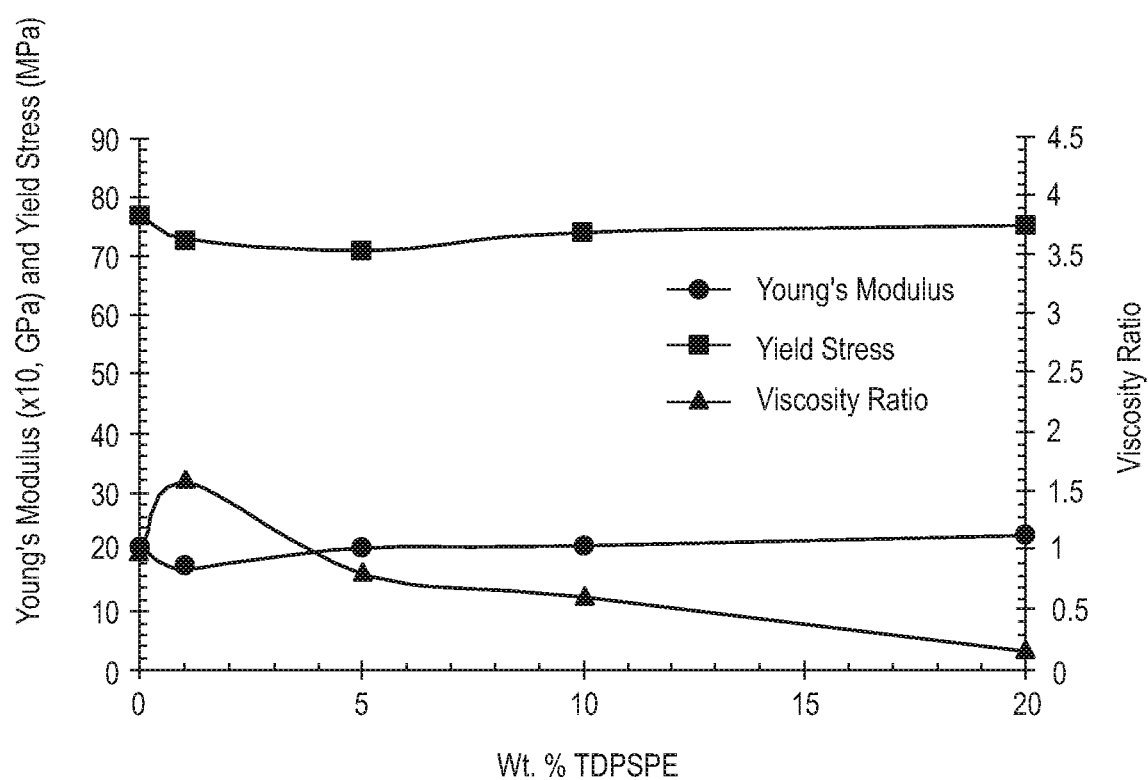
FIG. 3 is a graph that overlays viscosity trends with the mechanical properties of Young's modulus and yield stress for a polysulfone resin blended with the molecular glass TDPSPE.
Figure 4:
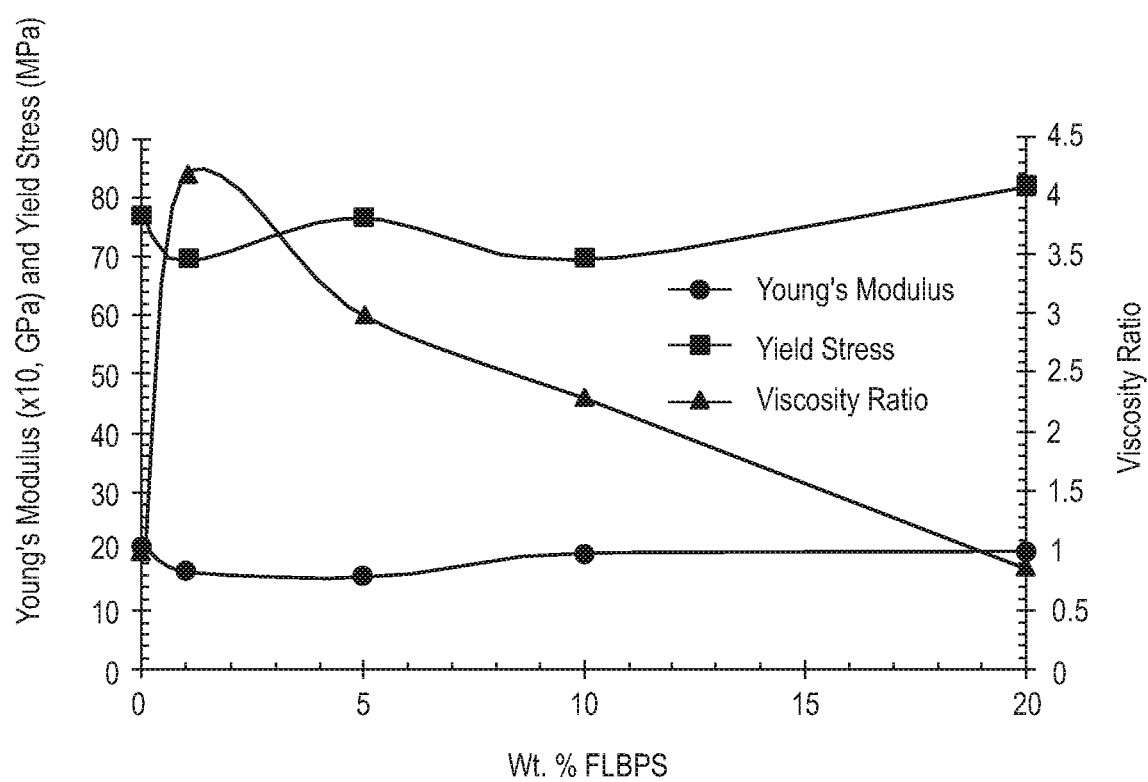
FIG. 4 is a graph that overlays viscosity trends with the mechanical properties of Young's modulus and yield stress for a polysulfone resin blended with the molecular glass FLBPS.
Figure 5:
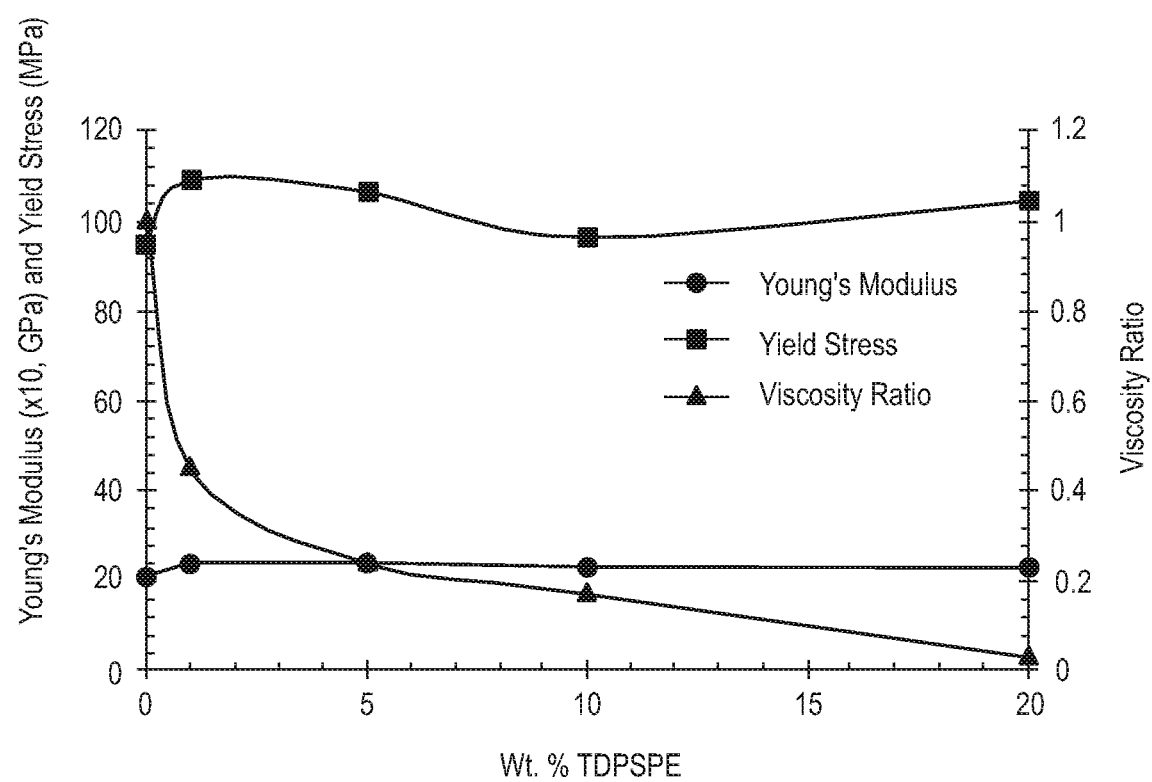
FIG. 5 is a graph that overlays viscosity trends with the mechanical properties of Young's modulus and yield stress for a poly(ether imide) resin blended with the molecular glass FLBPS.

The data in Tables 3-6 shows that although there was some deterioration of elongation at high molecular glass loadings, Young's modulus and yield stress remained unchanged regardless of the polymer resin and molecular glass used. FIGS. 2-5 overlay viscosity trends of the blended polymer resins against the mechanical properties for Young's modulus and yield stress from Tables 3-6, respectively. With reference to FIGS. 2-4, after an initial rise in melt viscosity, further incorporation of molecular glasses into the polysulfone resins resulted in a reduction in melt viscosity for the FLPS-containing blends (FIG. 2) and the TDPSPE-containing blends (FIG. 3). For the FLBPS-containing blends (FIG. 4), the melt viscosity was not reduced until 20 wt. % incorporation. In contrast, the incorporation of TDPSPE into the poly(ether imide) resin (FIG. 5) systematically reduced the melt viscosity across the compositional range probed. The molecular glass influence on the melt viscosity demonstrates the necessity of designing molecular glasses for the polymer resin of interest. The relatively constant Young's modulus and yield stress across all compositions illustrate the ability of molecular glasses to influence the melt viscosity without compromising key mechanical properties.

It is to be understood that while the invention has been described in conjunction with the embodiments set forth above, the foregoing description as well as the examples that follow are intended to illustrate and not limit the scope of the invention. Further, it is to be understood that the embodiments and examples set forth herein are not exhaustive and that modifications and variations of the invention will be apparent to those of ordinary skill in the art without departing from the scope and spirit of the invention.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

Synthesis of 9,9-bis(4-(4-(phenylsulfonyl)phenoxy) phenyl)-9H-fluorene (FLPS)

The following chemical compounds were added to a dry 500-mL, three-necked, round-bottomed flask: 4,4'-(9H-fluorene-9,9-diyl)diphenol (5.00 g); 4-chloro-diphenylsulfone (7.57 g); and dry potassium carbonate (9.9 g). After purging the reaction flask with nitrogen for 20 min, 50 mL of dimethylacetamide was added with 25 mL of toluene. The resulting heterogeneous solution was heated to 170° C. resulting in a toluene reflux. The water/toluene distillate was collected into a dean-stark trap and the water layer was extracted as an indication of the overall reaction progress. After 8 hours, the remaining toluene was distilled out (25 mL) leaving a lightly colored heterogeneous solution (50 mL of DMAC). The insoluble precipitate was filtered off and the filtrate was added dropwise to 500 mL of deionized water. The resulting off-white precipitate was collected by filtration and washed several times with water to yield the target compound, FLPS. Tg=71° C.

Example 2

Synthesis of 4,4',4''-(ethane-1,1,1-triyl)tris((4-(phenylsulfonyl)phenoxy)benzene) (TDPSPE)

The following chemical compounds were added to a dry 500-mL, three-necked, round-bottomed flask: 4,4',4''-(ethane-1,1,1-triyl)triphenol (5.00 g); 4-chloro-diphenylsulfone (11.13 g); and dry potassium carbonate (9.9 g). After purging the reaction flask with nitrogen for 20 min, 50 mL of dimethylacetamide was added with 25 mL of toluene. The resulting heterogeneous solution was heated to 170° C. resulting in a toluene reflux. The water/toluene distillate was collected into a dean-stark trap and the water layer was extracted as an indication of the overall reaction progress. After 8 hours, the remaining toluene was distilled out (25 mL) leaving a lightly colored heterogeneous solution (50 mL of DMAC). The insoluble precipitate was filtered off and the filtrate was added dropwise to 500 mL of deionized water. The resulting off-white precipitate was collected by filtration and washed several times with water to yield the target compound, FLPS. Tg=75° C.

Example 3

Synthesis of 4,4',4''-bis(9-(6-(4-(phenylsulfonyl) phenoxy)naphthalen-2-YL)-9H-fluoren-9-yl)-1,1'-biphenyl (FLBPS)

The following chemical compounds were added to a dry 500-mL, three-necked, round-bottomed flask: 6,6'-([1,1'-biphenyl]-4,4'-diylbis(9H-fluorene-9,9-diyl))bis(naphthalen-2-ol) (5.00 g); 4-chloro-diphenylsulfone (4.45 g); and dry potassium carbonate (9.9 g). After purging the reaction flask with nitrogen for 20 min, 50 mL of dimethylacetamide were added to 25 mL of toluene. The resulting heterogeneous solution was heated to 170° C. resulting in a toluene reflux. The water/toluene distillate was collected into a dean-stark trap and the water layer was extracted as an indication of the overall reaction progress. After 8 hours, the remaining toluene was distilled out (25 mL) leaving a lightly colored heterogeneous solution (50 mL of DMAC). The insoluble precipitate was filtered off and the filtrate was added dropwise to 500 mL of deionized water. The resulting off-white precipitate was collected by filtration and washed several times with water to yield the target compound, FLPS. Tg=186° C.

Example 4

Blending of Polymer and Molecular Glass

Blending of the high-performance polymer and the molecular glass was carried out through dissolution of the polymer and the molecular glass in the solvent N-methyl pyrrolidinone (NMP) followed by co-precipitation into water. 1 wt. % of the molecular glass (FLBPS was used as an exemplary molecular glass) was blended with polysulfone. At a 20 wt. % solids concentration, 9.9 g of polysulfone (Mw=51,000 g/mol, dispersity (D)=1.6, relative to polystyrene standards) and 0.1 g of FLBPS were co-dissolved in NMP overnight. The transparent solution was then added dropwise to 500 mL of water, resulting in a pearl-like precipitate. The precipitate was then filtered, washed with boiling water (3×100 mL), and dried overnight in a vacuum oven at 200° C. The solution composition is independent of the molecular glass used, meaning that the same weight was used for blending studies with FLPS, TDPSPE, and FLBPS. Table 7 shows the amounts used for the blending studies based upon differing wt % of molecular glass.

TABLE 7

| Wt % Molecular Glass | Solution Composition | | |
|---|---|---|---|
| | Molecular Glass (g) | Polymer/Resin (g) | NMP (mL) |
| 0 | 0 | 10 | 40 |
| 1 | 0.1 | 9.9 | 40 |
| 5 | 0.5 | 9.5 | 40 |
| 10 | 1 | 9 | 40 |
| 20 | 2 | 8 | 40 |

Example 5

Melt Viscosity Studies

The melt viscosities of the polymer and the polymer-molecular glass blends were determined using a TA Instruments AR 2000ex rheometer. The experiments were carried out in oscillatory shear with 1% strain and a variable frequency. A master curve was generated through time-temperature superposition, providing information across a wide range of temperatures and frequencies (Tables 1 and 2).

Example 6

Mechanical Property Studies

Films of the polymer-molecular glass blend were prepared using compression molding. Compression molding was performed at 300 and 320° C. for the polysulfone and poly(ether imide) resins, respectively. Following ASTM standard D882, the tensile properties of the polymer and molecular glass blends are shown in Tables 3-6 and the viscosity trends of the blends are shown in FIGS. 2-5.

We claim:

1. A composition comprising:
   a polymer with Tg>150° C. and Mw>10,000 g/mol; and
   a molecular glass, wherein the molecular glass in its neat state is amorphous and non-oligomeric with a polydispersity index between 1.0 and 1.7, Mw in the range of 500 g/mol to 2,000 g/mol, and at least one functional group that promotes miscibility with the polymer,
   wherein the molecular glass is dispersed in the polymer to form a resin and the molecular glass has a concentration in the resin of 0.01% to 50% w/w.

2. The composition of claim 1, wherein the resin has a zero-shear melt viscosity ratio that is less than 1.0.

3. The composition of claim 1, wherein the melt viscosity of the resin is less than the melt viscosity of the polymer in its neat state.

4. The composition of claim 1, wherein the Young's modulus and yield stress values of the resin are within 10% of the Young's modulus and yield stress values of the polymer in its neat state.

5. The composition of claim 1, wherein the polymer is a thermoplastic.

6. The composition of claim 1, wherein the polymer is selected from the group consisting of polysulfones, polyimides, poly(ether imides), polyketones, and poly(ether ketones), and combinations thereof.

7. The composition of claim 1, wherein the molecular glass in its neat state has a Tg>50° C.

8. The composition of claim 1, wherein the molecular glass in its neat state has a Tg in the range of 70° C. to 200° C.

9. The composition of claim 1, wherein the molecular glass has a structure with sulfone functional groups according to (A):

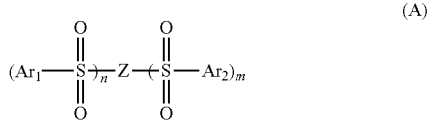

(A)

wherein each of n and m is an integer between 1 and 3 and 2≤(n+m)≤4;
Z is a linking group; and
Ar1 and Ar2 are identical or different aromatic groups.

10. The composition of claim 9, wherein Z is selected from the group consisting of linear aliphatic groups, branched aliphatic groups, cycloaliphatic groups, aromatic groups, esters, ethers, amides, and combinations thereof.

11. The composition of claim 9, wherein Ar1 and Ar2 independently comprise a phenyl ring.

12. The composition of claim 9, wherein Ar1 and Ar2 independently comprise an aromatic group bearing an additional functional group.

13. The composition of claim 12, wherein the additional functional group is selected from the group consisting of aliphatic groups, cycloaliphatic groups, aromatic groups, esters, ethers, amides, and combinations thereof.

14. The composition of claim 1, wherein the molecular glass has a structure with diphenylsulfone functional groups according to (B) or (C):

(B)

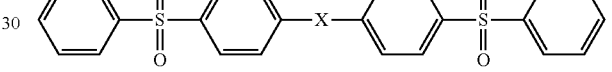

(C)

wherein X and Y independently comprise (i) at least one aromatic ring and (ii) ether linkages to the diphenylsulfone functional groups.

15. The composition of claim 1, wherein the molecular glass is selected from the group consisting of FLPS, TDPSPE, and FLBPS:

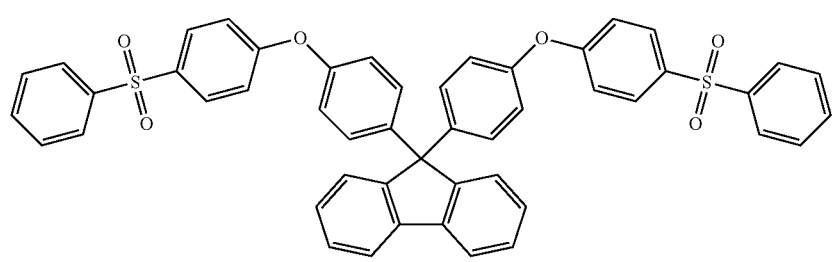

FLPS

-continued

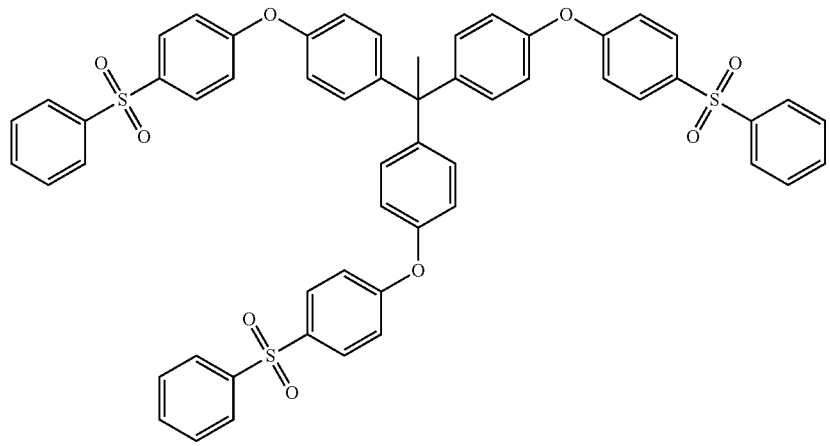

TDPSPE

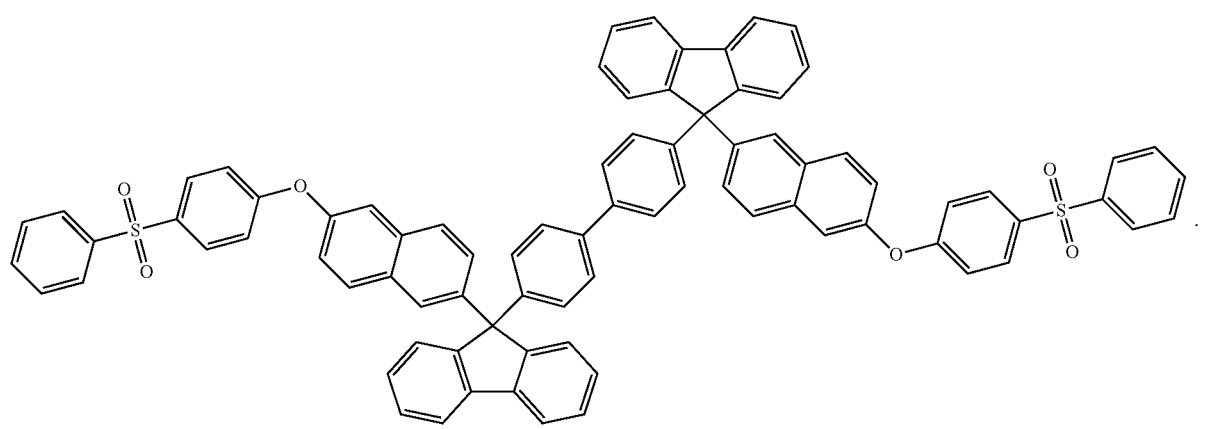

FLBPS

16. The composition of claim 1, wherein the at least one functional group of the molecular glass is selected from the group consisting of sulfones, ethers, esters, amides, isopropylidenes, and combinations thereof.

17. The composition of claim 1, wherein the at least one functional group of the molecular glass is a sulfone.

18. The composition of claim 1, wherein the molecular glass has an aromatic core.

19. The composition of claim 18, wherein the aromatic core comprises at least one phenyl ring.

20. A composition comprising:
a polymer with Tg>150° C. and Mw>10,000 g/mol; and
a molecular glass with sulfone functional groups, wherein the molecular glass has a structure according to (A):

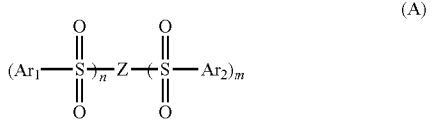

(A)

wherein each of n and m is an integer between 1 and 3 and 2≤(n+m)≤4;
Z is a linking group; and
Ar1 and Ar2 are identical or different aromatic groups,
wherein the molecular glass is dispersed in the polymer to form a resin and the molecular glass has a concentration in the resin of 0.01% to 50% w/w.

21. The composition of claim 20, wherein Z is selected from the group consisting of linear aliphatic groups, branched aliphatic groups, cycloaliphatic groups, aromatic groups, esters, ethers, amides, and combinations thereof.

22. The composition of claim 20, wherein Ar1 and Ar2 independently comprise a phenyl ring.

23. The composition of claim 20, wherein Ar1 and Ar2 independently comprise an aromatic group bearing at least one additional functional group.

24. The composition of claim 23, wherein the at least one additional functional group is selected from the group consisting of aliphatic groups, cycloaliphatic groups, aromatic groups, esters, ethers, amides, and combinations thereof.

25. The composition of claim 20, wherein the resin has a zero-shear melt viscosity ratio that is less than 1.0.

26. The composition of claim 20, wherein the melt viscosity of the resin is less than the melt viscosity of the polymer in its neat state.

27. The composition of claim 20, wherein the Young's modulus and yield stress values of the resin are within 10% of the Young's modulus and yield stress values of the polymer in its neat state.

28. The composition of claim 20, wherein the polymer is a thermoplastic.

29. The composition of claim 20, wherein the polymer is selected from the group consisting of polysulfones, polyimides, poly(ether imides), polyketones, and poly(ether ketones), and combinations thereof.

30. The composition of claim 20, wherein the molecular glass in its neat state has a Tg>50° C.

31. The composition of claim 20, wherein the molecular glass in its neat state has a Tg in the range of 70° C. to 200° C.

32. A composition comprising:
a polymer with Tg>150° C. and Mw>10,000 g/mol; and
a molecular glass with diphenylsulfone functional groups, wherein the molecular glass has a structure according to (B) or (C):

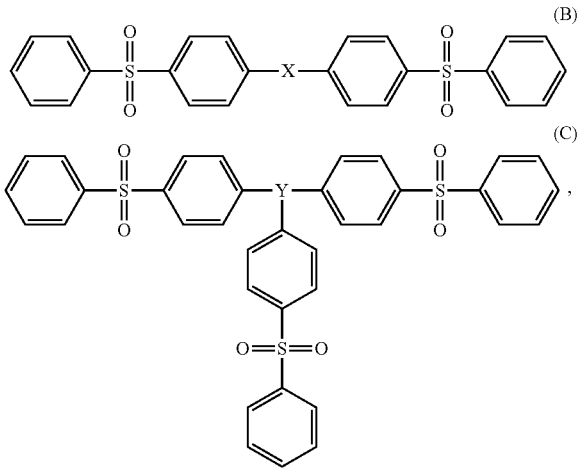

wherein X and Y independently comprise (i) at least one aromatic ring and (ii) ether linkages to the diphenylsulfone functional groups, wherein the molecular glass is dispersed in the polymer to form a resin and the molecular glass has a concentration in the resin of 0.01% to 50% w/w.

33. The composition of claim 32, wherein the resin has a zero-shear melt viscosity ratio that is less than 1.0.

34. The composition of claim 32, wherein the melt viscosity of the resin is less than the melt viscosity of the polymer in its neat state.

35. The composition of claim 32, wherein the Young's modulus and yield stress values of the resin are within 10% of the Young's modulus and yield stress values of the polymer in its neat state.

36. The composition of claim 32, wherein the polymer is a thermoplastic.

37. The composition of claim 32, wherein the polymer is selected from the group consisting of polysulfones, polyimides, poly(ether imides), polyketones, and poly(ether ketones), and combinations thereof.

38. The composition of claim 32, wherein the molecular glass in its neat state has a Tg>50° C.

39. The composition of claim 32, wherein the molecular glass in its neat state has a Tg in the range of 70° C. to 200° C.

* * * * *